US 11,451,929 B2

(12) United States Patent
Moon

(10) Patent No.: US 11,451,929 B2
(45) Date of Patent: Sep. 20, 2022

(54) LINK SIGNAL SETTING METHOD FOR POSITIONING MOBILE COMMUNICATION TERMINAL

(71) Applicants: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(72) Inventor: Hi Chan Moon, Seoul (KR)

(73) Assignees: IUCF-HYU (INDUSTRY-UNIVERSITY COOPERATION FOUNDATION HANYANG UNIVERSITY), Seoul (KR); INFOSEIZE SYSTEMS CO. LTD., Seoul (KR)

(*) Notice: Subject to any disclaimer, the term of this patent is extended or adjusted under 35 U.S.C. 154(b) by 0 days.

(21) Appl. No.: 17/050,472

(22) PCT Filed: Apr. 26, 2019

(86) PCT No.: PCT/KR2019/005082
§ 371 (c)(1),
(2) Date: Oct. 26, 2020

(87) PCT Pub. No.: WO2019/209074
PCT Pub. Date: Oct. 31, 2019

(65) Prior Publication Data
US 2021/0243562 A1   Aug. 5, 2021

(30) Foreign Application Priority Data

Apr. 27, 2018 (KR) .................. 10-2018-0048825
Apr. 25, 2019 (KR) .................. 10-2019-0048789

(51) Int. Cl.
H04W 4/02 (2018.01)
H04W 4/029 (2018.01)
(Continued)

(52) U.S. Cl.
CPC .......... *H04W 4/029* (2018.02); *G01S 13/765* (2013.01); *H04W 4/023* (2013.01); *H04W 76/27* (2018.02)

(58) Field of Classification Search
CPC ..... H04W 4/029; H04W 4/023; H04W 76/27; G01S 13/765
(Continued)

(56) References Cited

U.S. PATENT DOCUMENTS

2006/0072520 A1* 4/2006 Chitrapu .............. H04B 7/2656
370/337
2016/0295633 A1* 10/2016 Baligh .................. H04W 76/25
2017/0079006 A1* 3/2017 Li ...................... H04W 72/0473

FOREIGN PATENT DOCUMENTS

CN          1276956 A     12/2000
CN        101325782 A     12/2008
(Continued)

OTHER PUBLICATIONS

International Search Report of PCT/KR2019/005082 dated Nov. 13, 2019 [PCT/ISA/210].
(Continued)

*Primary Examiner* — Ted M Wang
(74) *Attorney, Agent, or Firm* — Sughrue Mion, PLLC

(57) ABSTRACT

Proposed are an apparatus and a method for estimating the position of a target terminal within a mobile communication system. In general, a mobile communication system is composed of a base station and terminals. In the present invention, one or more positioning devices are placed around a target terminal required to be positioned to measure
(Continued)

a transmission signal of the target terminal, and accurately measures the position of the target terminal on the basis of the transmission signal. In the above process, the base station should connect a communication channel with the terminal for positioning of the terminal, and a method therefor is proposed. In particular, the present invention relates to a method for setting a terminal in a standby state to transmit an uplink signal. In addition, an operation and a protocol for positioning the target terminal are proposed.

13 Claims, 10 Drawing Sheets

(51) Int. Cl.
*H04W 76/27* (2018.01)
*G01S 13/76* (2006.01)

(58) Field of Classification Search
USPC .................................................. 455/456.1
See application file for complete search history.

(56) References Cited

FOREIGN PATENT DOCUMENTS

| CN | 101772160 A | 7/2010 |
|---|---|---|
| CN | 105637953 A | 6/2016 |
| CN | 107318171 A | 11/2017 |
| EP | 3 697 165 A1 | 8/2020 |
| ER | 3 506 708 A1 | 7/2019 |
| JP | 2016-500214 A | 1/2016 |
| KR | 10-2008-0055623 A | 6/2008 |
| KR | 10-2008-0065113 A | 7/2008 |
| KR | 10-2010-0028475 A | 3/2010 |
| KR | 10-2012-0055118 A | 5/2012 |
| KR | 10-1779767 B1 | 9/2017 |
| KR | 10-2018-0035638 A | 4/2018 |
| WO | 00/78084 A1 | 12/2000 |
| WO | 2011/093605 A2 | 8/2011 |
| WO | 2012/075802 A1 | 6/2012 |
| WO | 2014/027803 A2 | 2/2014 |
| WO | 2014/053998 A1 | 4/2014 |
| WO | 2016/032200 A2 | 3/2016 |
| WO | 2016/163770 A1 | 10/2016 |
| WO | 2017/133004 A1 | 8/2017 |

OTHER PUBLICATIONS

Nokia, Alcatel-Lucent Shanghai Bell, "Data Transmission in INACTIVE", 3GPP TSG-RAN WG2 Meeting #96, R2-167706, Reno, USA, Nov. 14- 18, 2016 (7 pages total).

Samsung, "Data transfer in inactive state based on 4-step RACH procedures", 3GPP TSG-RAN WG2 #97, R2-1701529, Athens, Greece, Feb. 13-17, 2017, pp. 1-7 (7 pages total).

* cited by examiner

LINK SIGNAL SETTING METHOD FOR POSITIONING MOBILE COMMUNICATION TERMINAL

TECHNICAL FIELD

The present disclosure relates to methods and apparatuses for estimating a position of a target terminal within a mobile communication system.

BACKGROUND ART

A typical mobile communication system is composed of a base station and a terminal. In the typical mobile communication system, a method of estimating a position of a terminal is performed based on a signal transmitted by the terminal. Such a typical method of estimating the position of the terminal uses a delay value of the signal transmitted by the terminal in reaching a base station. Further, as a signal propagates from a terminal to a base station over a channel, a distance between the terminal and the base station may be estimated based on an amount of propagation attenuation occurring on the channel. As a communication method used to do this, various methods may be used of using communication between a typical base station and a terminal.

In the present disclosure, a terminal required to be located is referred to as "target terminal". A method for accurately locating a target terminal is proposed in Korea Patent Application No. 10-2019-0045762. In Korea Patent Application No. 10-2019-0045762, by employing a device obtaining uplink resource assignment information transmitted by a wireless communication system, and an uplink receiver, a method is proposed for obtaining position information on a terminal based on information on whether the terminal transmitting a signal over the corresponding uplink resource is placed around the device based on the uplink resource assignment information, a strength of the signal, a time delay, and the like. In Korea Patent Application No. 10-2019-0045762, a communication link is established between a base station of a mobile communication network and a target terminal. Further, measurement information resulted from measurement for an uplink signal or channel of the target terminal taken by a positioning device is transmitted to a position measurement server, and then the position measurement server calculates a position of the target terminal.

In order to measure a position of the target terminal accurately, the target terminal is required to transmit uplink signals during a certain period. Further, the base station or a positioning device measures a signal transmitted by the target terminal.

When the target terminal is in a call-connected state, the target terminal continually transmits signals to, or receives signals from, the base station. Thus, the base station can perform a distance or position measurement based on signals transmitted by the terminal. If the terminal is required to transmit a specific signal to measure more accurately, the base station may instruct the terminal to transmit such signal.

In another situation, when target terminals are in a standby state, the terminals do not transmit a signal during a certain period, or transmit signals at relatively low frequency. In this case, it is not easy for the base station or one or more positioning devices to measure a distance or position based on a signal transmitted by the terminal.

Further, in order for the positioning device to measure a signal from the terminal accurately, it is necessary to design operations and protocols between the base station of an associated mobile communication network, a position measurement server, and the positioning device.

DETAILED DESCRIPTION OF THE INVENTION

Technical Problem

In accordance with embodiments of the present disclosure, when it is desired to measure a position of a target terminal in a standby state, methods are provided for enabling the target terminal to transmit an uplink signal for position measurement while avoiding or minimizing a change in operation of the target terminal. The positioning device can measure a distance, a position, and the like based on an uplink signal transmitted by the target terminal.

Further, in accordance with embodiments of the present disclosure, methods, processes, operations and/or protocols are provided for efficient operation and communication between a base station of a mobile communication network, a position measurement server, one or more positioning devices, which are related to position measurement of a target terminal.

Technical Solution

In one aspect of the present disclosure, a method is provided for accurately measuring a position of a target terminal, the method including placing one or more positioning devices around a target terminal required to be located, measuring a signal transmitted by the target terminal, and based on this, measuring the position of the target terminal. In another aspect of the present disclosure, processes, operations and/or protocols are provided for inter-operation and/or communication between a base station of a mobile communication network, a position measurement server, one or more positioning devices.

Effects of the Invention

In accordance with embodiments of the present disclosure, when attempting to measure a position of a target terminal in a standby state, it is possible to enable the target terminal to transmit an uplink signal for position measurement while avoiding or minimizing a change in operation of the target terminal.

Further, in accordance with embodiments of the present disclosure, it is possible to provide efficient operation methods and protocols between a base station of a mobile communication network, a position measurement server, one or more positioning devices, which are needed to measure a position of a target terminal.

BEST MODE FOR CARRYING OUT THE INVENTION

Figure 1:
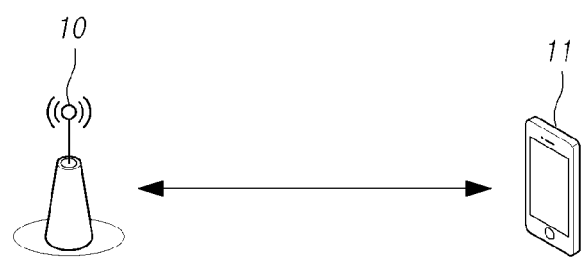
FIG. 1 illustrates typical position measurement based on a base station.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

In the present disclosure, a wireless communication system is widely deployed to provide various communication services, such as a voice communication service, a packet data service, etc. The wireless communication system includes a user equipment (hereinafter, referred to as "UE") and a base station (BS, or eNB). In the present disclosure, the UE is defined as a generic term referring to terminals used in wireless communications. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, the base station or cell is defined as a generic term including, but not limited to, as well as some areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms and provides a corresponding communication service area, such as a megacell, a macrocell, a microcell, a picocell, a femtocell, or a small cell, or 2) a communication service area. In the case of 1), the base station may be referred to i) apparatuses that form and provide area corresponding communication service area and are controlled by the same entity or ii) apparatuses that interact and cooperate with each other for forming and providing the corresponding communication service area. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (hereinafter, referred to as "UL") refers to data transmission/reception by a UE to/from a base station, and the downlink (hereinafter, referred to as "DL") refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. Embodiments of the present disclosure may be apply to resource assignment in i) asynchronous wireless communication evolving into long term evolution (LTE)/LTE-advanced and 5G from GSM, WCDMA, and HSPA, ii) synchronous wireless communication evolving into code division multiple access (CDMA), CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, under the related standard, in some systems such as the LTE system or the LTE-advanced system, the UL and the DL are configured based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station or macrocell (hereinafter, referred to as 'eNB') and at least one remote radio head (RRH) that is connected to the eNB through an optical cable or an optical fiber and thereby controlled in a wired manner, and that has high transmission power or low transmission power in the macrocell area.

Hereinafter, the DL denotes communication or a communication path from multiple transmission/reception points to a UE, and the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, transmission and reception of a signal through a channel such as the PUCCH, the PUSCH, the PDCCH, the EPDCCH, or the PDSCH, may be described as the transmission and reception of the PUCCH, the PUSCH, the PDCCH, the EPDCCH, or the PDSCH.

In addition, hereinafter, a description of transmitting or receiving a PDCCH or a description of transmitting or receiving a signal through the PDCCH may be used as meaning including transmitting or receiving an EPDCCH or transmitting or receiving a signal through the EPDCCH.

That is, a physical DL control channel described below may mean the PDCCH or the EPDCCH, or is also used as meaning including both the PDCCH and the EPDCCH.

Also, for convenience of description, the EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below includes radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

In accordance with embodiments of the present disclosure, methods and apparatuses are provided for estimating a position of a target terminal within a mobile communication system. A typical mobile communication system is composed of a base station and one or more terminals. A position of a target terminal can be accurately measured by placing one or more positioning devices around a target terminal required to be located, measuring a signal transmitted by the target terminal, and measuring the position of the target terminal based on this. In this process, it is necessary for a base station to establish a communication channel with the terminal in order to allow a position of the terminal to be measured. In accordance with an embodiment of the present disclosure, a method is provided of establishing such a communication channel. In particular, in accordance with an embodiment of the present disclosure, a method is provided of enabling a terminal in a standby state to transmit an uplink signal. However, embodiments of the present disclosure are not limited thereto. It should be understood that embodiments of the present disclosure may be applicable to a terminal in a call-connected state, as well as the terminal in the standby state.

The present disclosure relates to obtaining position information for one or more terminals in a wireless communication system.

Embodiments of the present disclosure may be applicable to locating a missing person or a person in distress, estimating a corresponding position for lifesaving in case of disaster or distress through mobile communication systems, and providing a position-based service by accurately identifying a position of a terminal.

Embodiments of the present disclosure are expected to be applied to a base station of a mobile communication network and an associated service.

A related technology that is closely associated with the embodiments or examples of the present disclosure is mobile communication systems.

FIG. 1 shows a configuration of a mobile communication system. Referring to FIG. 1, the mobile communication system is made up of a base station 10 and a terminal 11. A position of the terminal 11 is estimated based on a signal transmitted by the terminal 11. A typical method of estimating the position of the terminal is to use a propagation delay value taken for the signal transmitted from the terminal 11 to reach the base station 10. Further, a distance between the terminal 11 and the base station 11 may be estimated based on an amount of propagation attenuation occurring on a channel on which a signal transmitted by the terminal 11 reaches the base station 10. In order to measure a position of a target terminal accurately, the target terminal is required to transmit uplink signals during a certain period. Further, the base station or a positioning device measures a signal transmitted by the target terminal. Herein, the positioning device denotes a device capable of finding or measuring a position of a terminal, locating the terminal, or measuring/obtaining/calculating information or data related to the terminal (hereinafter, described as "positioning device").

When the terminal 11 is in a call-connected state, the terminal 11 uninterruptedly transmits signals to, and receives signals from, the base station 10. Thus, the base station 10 can measure a distance or a position based on a signal transmitted by the terminal 11. Further, when it is necessary for the terminal 11 to transmit a specific signal to measure more accurately, the base station 10 may instruct the terminal 11 to transmit the specific signal. The specific signal may be an uplink signal that can be periodically transmitted in a wideband.

In another situation, when the terminal 11 is in a standby state, the terminal 11 does not transmit a signal during a certain period, or transmits signals relatively less frequently. Thus, when a target terminal is in the standby state, it is very difficult for the base station or one or more positioning devices to measure a distance or position based on an uplink signal transmitted by the target terminal.

Hereinafter, embodiments of the present disclosure will be discussed in detail with reference to accompanying drawings. Further, in describing embodiments of the present disclosure, detailed discussions on known functions and configurations incorporated herein may be omitted when it is needed to focus on the subject matter of the present disclosure. The terms described below are terms defined considering embodiments, examples, and technical ideas in the present disclosure, and may be differently expressed according to intentions or customs of a user, an operator, or the like. Thus, such definition should be interpreted based on the context of the present disclosure In the present disclosure, a method is provided of efficiently measuring a position of a target terminal in a mobile communication environment in which each of one or more terminals and a base station transmits a signal to, and receives a signal from, each other, and one or more positioning devices are placed around the target terminal required to be located. The positioning device herein captures a signal transmitted by the target terminal and measures a position of the target terminal based on the captured signal. In order to measure accurately a position of the target terminal, one or more positioning devices may be placed around the target terminal. The positioning device according to embodiments of the present disclosure may be used while being carried by a user, or may also be used while being installed in a vehicle or a drone. Further, a base station in a typical macro or small cell may serve as the positioning device in the present disclosure.

Figure 2:
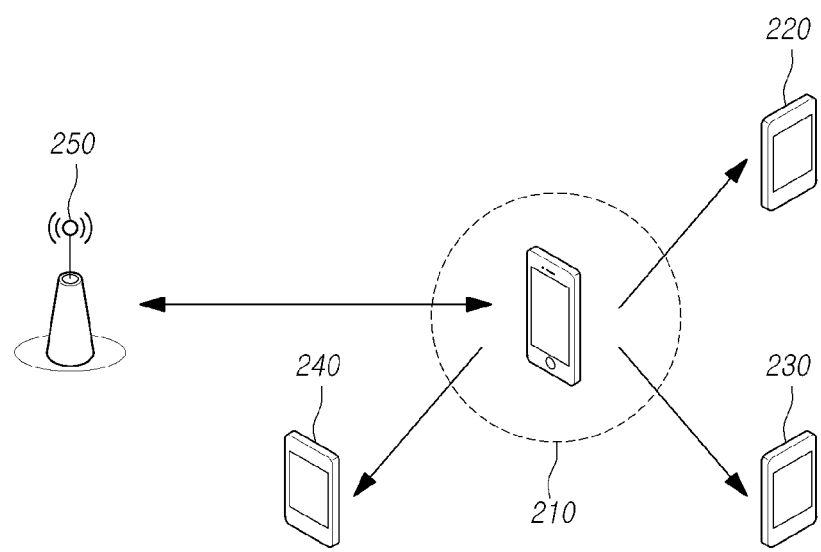
FIG. 2 illustrates a conception of position measurement according to an embodiment of the present disclosure.

FIG. 2 illustrates operations of a positioning device according to embodiments of the present disclosure. Referring to FIG. 2, each of a base station 250 and a target terminal 210 transmits a signal to, and receives a signal from, each other in mobile communication systems. One or more positioning devices (220, 230, 240) according to embodiments of the present disclosure are placed around the target terminal 210 required to be located, and receive a signal transmitted by the target terminal 210, and based on this, measures a position of the target terminal 210. At this time, the position of the target terminal 210 can be measured based on at least one of a delay of the signal from the target terminal 210 in reaching each of one or more positioning devices (220, 230, 240), a direction in which the signal is received, a strength of the received signal, and the like. In order to measure accurately a position of the target terminal 210, one or more positioning devices (220, 230, 240) may be placed around the target terminal. Further, a position of the target terminal 210 may be measured more accurately by combining at least one of a strength and a time delay of a signal received by the base station 250 and at least one of measurements of the signal received by one or more positioning devices (220, 230, 240).

Examples of the positioning device employed in the present disclosure may be referred to Korea Patent Application No. 10-2018-0046139, entitled "APPARATUS AND METHOD FOR POSITIONING OF MOBILE COMMUNICATION UE"; Korea Patent Application No. 10-2018-0048825, entitled "APPARATUS AND METHOD FOR CONFIGURING UPLINK SIGNAL FOR POSITIONING OF MOBILE COMMUNICATION UE"; Korea Patent Application No. 10-2018-0101066, entitled "METHOD AND APPARATUS FOR POSITIONING USER EQUIPMENT IN MOBILE COMMUNICATION SYSTEM"; and Korea Patent Application No. 10-2019-0045762, entitled "POSITION MEASUREMENT SYSTEM FOR MOBILE TERMINAL". Further, a typical base station may serve as the positioning device.

In accordance with embodiments of the present disclosure, a method is provided for measuring a position of a terminal in a standby state. In particular, in accordance with an embodiment of the present disclosure, a method is provided of enabling a terminal in the standby state to transmit an uplink signal. Further, in this process, it is an objective to minimize a change in noticeable operations of the terminal in the standby state, such as a change in input-related operations, display-related operations, notifications, or the like.

A method of establishing a call and a method of transmitting a short message service (SMS) or multimedia message service (MMS) are available as methods of transmitting data to a terminal in the standby state. Among these methods, the method of establishing a call is generally used when large data transfer or long-time communication is required as in a voice call, a file transfer, and the like. In this case, such a call establishment is completed when a user of a called terminal presses a calling button or a response button for the call establishment.

On the other hand, the method of transmitting the SMS/MMS is used generally for the purpose of transmitting relatively small amount of data in a short time, and enables a small volume of messages to be transmitted even when a user of a corresponding terminal does not respond to this. Generally, in case of the SMS/MMS, after such data transmission is completed, the transmitted message is indicated to, or displayed on, the terminal. In the present disclosure, when a target terminal required to be located in a standby state, a method is provided for enabling the terminal to transmit an uplink signal using such a SMS/MMS.

Figure 3:
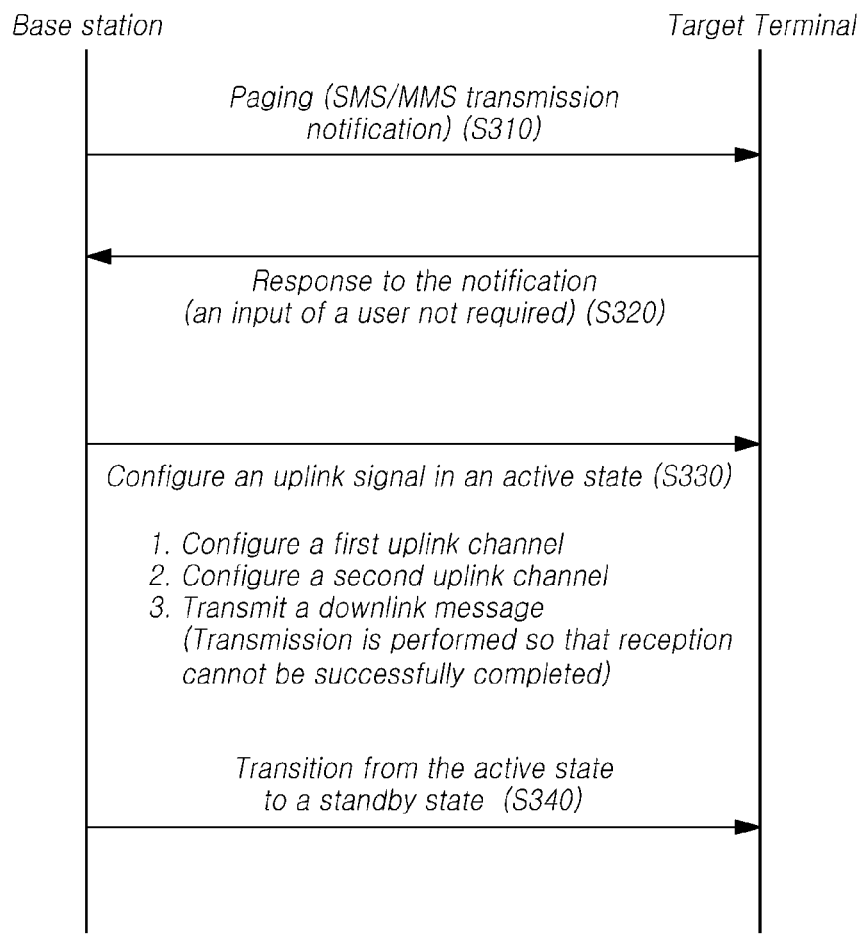
FIG. 3 is a signal flow diagram illustrating a link signal control method according to an embodiment of the present disclosure.

FIG. 3 illustrates signal flows according to the method provided in the present disclosure. Referring to FIG. 3, a base station transmits a message notifying a target terminal required to be located of a SMS/MMS transmission through paging, at step S310. The target terminal transmits a response signal in response to the notification to the base station, at step S320. The response signal is transmitted regardless of a response of a user of the target terminal. Thereafter, the base station transmits a corresponding message required to be transmitted to the terminal. Generally, the above process for message transmission/reception is performed when the terminal is in an active state, that is, after the terminal in a standby state transitions to the active state. After successfully receiving data transmitted by the base station, the terminal provides a message indicating that the reception of the message has been completed to the base station. The terminal displays the message on a display or provides it to a corresponding user.

In FIG. 3, the terminal transitions to the active state through the SMS/MMS message transmission notification. In one embodiment, an operation similar to the operation as in FIG. 3 may be performed by allowing the base station to request the target terminal to report a channel state, a state or function of the terminal itself, a corresponding channel environment, or the like, and the terminal to respond to the request. In another embodiment, a similar operation may be also performed by instructing the target terminal to perform a registration. In this case, while a step in which the base station transmits a corresponding message is not performed, the terminal may be configured to transmit uplink signals during a certain period.

In the present disclosure, a method is provided for enabling a terminal in a standby state to transmit uplink signals needed for position measurement through the SMS/MMS message transmission process. When data transmission is performed through a typical call establishment, a user's response is needed, or a call is established through an application as in a smartphone. In accordance with embodiments of the present disclosure, a method is provided for enabling a terminal to transmit an uplink signal even in a situation where an application is not installed in a terminal such as a smartphone, and a user does not make a response.

In accordance with embodiments of the present disclosure, through the process of FIG. 3, a base station starts an SMS/MMS transmission with a target terminal required to be located in a standby state. After receiving a response from the target terminal, the base station transmits a message required to transmitted as in the typical case, and the terminal receives the message from the base station. This message transmission/reception is typically performed when the terminal is in the active state. In the process of transmitting/receiving the message, when the terminal successfully receives the message, the terminal provides this to not only the base station, but a user of the terminal by displaying it on a display of the terminal.

If the terminal fails to receive the message in the process of receiving the message, the terminal determines that the corresponding SMS/MMS transmission is not successfully performed and does not display the message on the display. In the present disclosure, in the process of transmitting a SMS/MMS, a method is provided of transmitting a signal for causing a target terminal not to make a determination that a corresponding message reception is completed, and configuring the terminal to transmit an uplink signal needed for position measurement. That is, in the present disclosure, a method is provided of terminating an SMS/MMS transmission in a situation where a reception completion determination for a message to be transmitted though the SMS/MMS is not made by the target terminal, In the present disclosure, when a base station notifies a terminal of an SMS/MMS transmission, the terminal enters a state capable of receiving a corresponding message. Generally, a message reception is performed in the active state. The terminal in such message reception state is configured to transmit an uplink signal needed for position measurement. In this situation, the SMS/MMS transmission is terminated after a predetermined time elapses. In particular, in a situation where the terminal has not successfully received the SMS/MMS message, the SMS/MMS transmission process is terminated. Through this, the terminal may not be allowed to display any message related to the SMS/MMS message on the display.

Various SMS/MMS message transmission methods can be used for achieving objectives of the present disclosure. Such methods are as follows.

(1) A base station does not transmit a message to a terminal. That is, after transitioning to the active state to transmit a message, the terminal is configured to transmit an uplink signal while not transmitting the message.

(2) The base station intentionally transmits a message causing a CRC error so that the terminal transmits a message. In this case, it is difficult for the terminal to successfully complete a corresponding message reception.

(3) The base station transmits a signal by adding a large volume of noises or an interference signal so that the terminal cannot successfully receive a message.

(4) The base station does not transmit a signal used for channel estimating, such as a reference signal, a pilot, or the like, or transmits a wrong signal so that the terminal cannot estimate a channel needed to receive a message.

(5) The base station transmits data with a modulation and coding scheme (MCS) higher than a modulation and coding scheme (MCS) with which a data reception is available in a channel state.

These are methods of intentionally transmitting a signal causing a message reception not to be successfully completed in an SMS/MMS transmission process. Using these methods, a base station may configure a terminal to transmit an uplink signal while maintaining a connection with a terminal. Among these methods, the most efficient method in an aspect of resource assignment is the first method (1) in which any message is not transmitted.

As such, the base station causes the terminal in the standby state to transitions to the activation state by transmitting an SMS/MMS, and configures the terminal to transmit an uplink signal, at step S330. As the base station configures the target terminal to transmit an uplink signal repeatedly in a predetermined time or more, therefore, a positioning device can easily detect and measure the signal from the target terminal. Thereafter, the base station provides information related to such transmission to the positioning device and a position measurement server, leading to at least one of the positioning device and the position measurement server to measure the uplink signal from the target terminal.

Further, in a similar embodiment, when the target terminal required to be located is in the standby state, a similar operation to the first method (1) may be performed by enabling the base station of an associated mobile communication network to transmit a paging command to the target terminal. The paging message is not intended to establish a voice call or a data channel. Instead, in order for such a similar operation to be performed, the paging message is used for instructing the terminal to report a state of the terminal, a channel environment or function, or instructing the terminal to perform a registration or report a channel situation. Even when a user of the target terminal does not input a response to the terminal, the paging has a characteristic of enabling the target terminal to transmit a response signal for the paging and transitions to the active state. Further, the paging has a characteristic of avoiding or minimizing noticeable changes of the target terminal such as input-related operations, display-related operations, notifications, or the like. That is, the paging has characteristic of causing a user of the target terminal not to be informed of the paging, and an establishment of an uplink channel performed after the paging through a function of display, sound or vibration in the terminal. Thus, in the present disclosure, even when a user of the target terminal does not respond, the base station causes the terminal to transition to the active state. Further, the base station causes the target terminal to transmit an uplink signal, and provides information related to the uplink signal transmission to a position measurement server or a positioning device. This information includes information on a start of the uplink signal transmission of the target terminal. The positioning device received the information on the start of the uplink signal transmission of the target terminal measures an uplink signal from the target terminal based on the information related to the uplink transmission. The positioning device provide a measurement of the uplink signal transmitted by the target terminal to the position measurement server, and the position measurement server calculates a position of the target terminal based on this.

In another embodiment, two or more positioning devices according to embodiments of the present disclosure may share a relative position between the positioning devices and measurement information through communication with one another, and based on these, measure a position of the target terminal. Further, one of two or more positioning devices may receive information on positions and measurements from the others of the two or more positioning devices, and then, calculate a position of the target terminal.

Further, the base station in the present disclosure may configure a target terminal to transmit an uplink signal periodically even after the target terminal transitions from the standby state into the active state. In order to measure a position of a target terminal, it is necessary for the target terminal to transmit an uplink signal. In the present disclosure, in enabling a target terminal to transmit an uplink signal, the target terminal that has transitioned from the standby state to the active state may periodicity or frequently transmit the uplink signal during a predetermined time. For example, in case of the LTE system, a target terminal may periodicity or frequently transmit a PUSCH channel or an SRS channel. For example, a base station may request or instruct a target terminal to transmit specific data through a wideband uplink. In one embodiment, the base station may instruct the target terminal to transmit downlink channel information, or the like measured by the target terminal with a very low MCS (an MCS with a transmission rate much lower than that corresponding to an assigned resource) at a predetermined period. In another embodiment, the base station may instruct the target terminal to transmit a parameter (e.g., power head room report) related to transmission power of the target terminal or a parameter related to a function or the like of the target terminal with a low MCS at a predetermined period. Further, the base station may instruct the target terminal to transmit a PUDDC periodically.

Further, the base station may configure the target terminal to transmit uplink signals configured on two or more different types of channels. The two different channels may be referred to as a first uplink signal and a second uplink signal. The first uplink signal is a signal characterized by being transmitted on a narrowband relatively more frequently, and the second uplink signal is a signal characterized by being transmitted on a wideband relatively less frequently. For example, a PUCCH and a PUSCH may be configured to be transmitted. Further, a PUCCH and an SRS may be configured to be transmitted. The SRS and the PUSCH may be simultaneously configured. In another embodiment, a high frequent PUSCH configuration based on a narrowband and a low frequent PUSCH configuration based on a wideband may be configured to be transmitted simultaneously.

Position estimating of one or more positioning devices according to embodiments of the present disclosure may be performed using one type of uplink signal. Alternatively, position estimating may be performed based on results from measurement for these two or more different types of signals taken by the one or more positioning devices and a base station. An uplink signal of the narrowband is advantageous in calculating average power of a target terminal. A signal of the wideband is used for more accurately measuring a distance and a position by measuring a propagation delay. In a normal case where a base station transmits an SMS/MMS to a terminal, or in the case of the paging provided in the present disclosure in which a terminal is requested to transmit measurement, registration, state information, and the like of the terminal, there is a difference in that such terminals does not frequently transmit a wideband signal in the uplink.

In the present disclosure, it is basically or firstly used to find a proximate position of a target terminal based on a measurement obtained by using a typical mobile communication network. In this process, a position of the target terminal may be found by additionally using a WiFi device, a GPS device, or the like of the target terminal. In the above process, it is possible to obtain information of a cell of an associated mobile communication network in which the target terminal is placed and position information of a base station of the cell. Further, it is possible to obtain approximate position information of the target terminal. Further, it is possible to obtain information on accuracy of the position information of the target terminal. The accuracy of the position information may be represented as a radius around a specific position.

Searchers carrying positioning devices obtained such information request to establish respective links with the target terminal around the target terminal. The link establishment request may be performed such that the searcher requests a call establishment to a position measurement server through the positioning device. Further, the call establishment request may be performed by directly inputting such request to the position measurement server.

When the call establishment request is inputted, the position measurement server requests the call establishment from an associated mobile communication network. Normally, a base station that can maintain the best channel state with the target terminal in the mobile communication network is selected, and then, the corresponding call establishment with the base station is performed. In this case, when the target terminal is in the standby state, the target terminal is configured to transition to the active state through the paging provided by embodiments of the present disclosure. Further, in the active state, the base station configures the target terminal to transmit an uplink signal. Thereafter, the base station of the mobile communication network transmits the call establishment and uplink signal transmission configuration information of the target terminal to the position measurement server. The position measurement server transfers the call establishment and the uplink signal transmission configuration information of the target terminal to one or more positioning devices and enables the one or more positioning devices to detect and measure a signal from the target terminal. The call establishment information may include the fact that a corresponding call has been established.

In the above process, in case the target terminal is in the standby state, it may take some time to perform the call establishment with the base station. This is caused by a time delay occurred in the paging and channel configuration process. Thus, the positioning device may identify which state a link between a base station of a current mobile communication network and the target terminal is in, and provide information on this to a corresponding searcher.

In the above process, the positioning device and the position measurement server are needed to identify the information on which state the link between the base station and the target terminal is in. That is, in case the target terminal is in the standby state, the target terminal may be in one of the following states, (1) Standby state
(2) Call establishment continuation
(3) In active state and measurement-used signal configuration continuation
(4) Measurement-used signal transmission continuation in the active state The base station maintaining a link with the target terminal in the mobile communication network provides the position measurement server with information on which state the link with the target terminal is in. Further, the position measurement server provides this information to one or more positioning devices. Thus, the positioning device and the position measurement server performs measuring for the target terminal only in a situation where the target terminal transmits a measurement-used signal in the active state. Further, the positioning device may provide such a state of the target terminal to a corresponding searcher by displaying it on a display.

In the above states, a combination between a call establishment continuation state of the target terminal as in (2) and an uplink signal configuration state of the target terminal in the active state as in (3) may be defined as a state of call establishment of the target terminal and uplink signal configuration.

If measuring is performed for a target terminal having a call connection already established with a base station and being in the active state, the target terminal may be in one of the following states.

(1) Normal active state (before a measurement request for the target terminal)
(2) Measurement-used signal configuration continuation in the active state
(3) Measurement-used signal transmission continuation in the active state The base station of the mobile communication network provides the position measurement server with information on which state a link with the target terminal is in. Further, the position measurement server provides this information to one or more positioning devices. Thus, the positioning device and the position measurement server performs measuring for the target terminal only in a situation where the target terminal transmits a measurement-used signal in the active state. Further, the positioning device may provide such a state of the target terminal to a corresponding searcher by displaying it on a display. At this time, the state of the positioning device may be classified into an initial state (before a measurement request for the target terminal), a call establishment state of the target terminal (after the measurement request for the target terminal), an uplink signal configuration continuation state of the target terminal, a measurement-used uplink signal transmission state of the target terminal, and the like, and thus, one of these states may be displayed on the display of the positioning device.

Further, the positioning device performs detecting and measuring only in the measurement-used uplink signal transmission state of the target terminal. Further, the positioning device shares the above state with the position measurement server, and the position measurement server calculates a position of the target terminal only in the measurement-used uplink signal transmission state of the target terminal.

If the base station configures the target terminal to periodically transmit random access in the standby state, even when the target terminal is in the standby state, the target terminal may be configured to transmit a random access channel that is the measurement-used uplink signal, and thus, the positioning device and the position measurement server can perform measuring for the target terminal. Considering this case, the base station of the mobile communication network may provide information on whether the target terminal is in standby state or in the active state to the positioning device and the position measurement server.

In another embodiment, a state of the positioning device may be classified into the following states.

(1) Standby state
(2) Uplink channel configuration standby state of a target terminal
(3) Measurement available state of the target terminal (uplink signal transmission state of the target terminal)

The standby state of the positioning device denotes a state in which the positioning device has not performed a position measurement request for the target terminal yet. That is, this denotes a state in which a measurement-used uplink signal configuration for the target terminal has not been performed yet in the base station of the mobile communication network. The uplink channel configuration standby state of the target terminal denotes a state in which the base station is configuring a measurement-used uplink signal for the target terminal, or a state in which the positioning device has not received yet channel configuration information, resource assignment information, or terminal identification information for the target terminal. The measurement available state of the target terminal denotes a state in which the base station has configured a measurement-used uplink signal for the target terminal and the positioning device has obtained the channel configuration information, the resource assignment information, or the terminal identification information for the target terminal. In the measurement available state of the target terminal, the positioning device and the position measurement server can measure a signal from the target terminal. Specifically, in this state, the positioning device reports a result obtained by measuring an uplink signal from the target terminal to the position measurement server, and the position measurement server calculates a position of the target terminal based on the measurement result.

Figure 4:
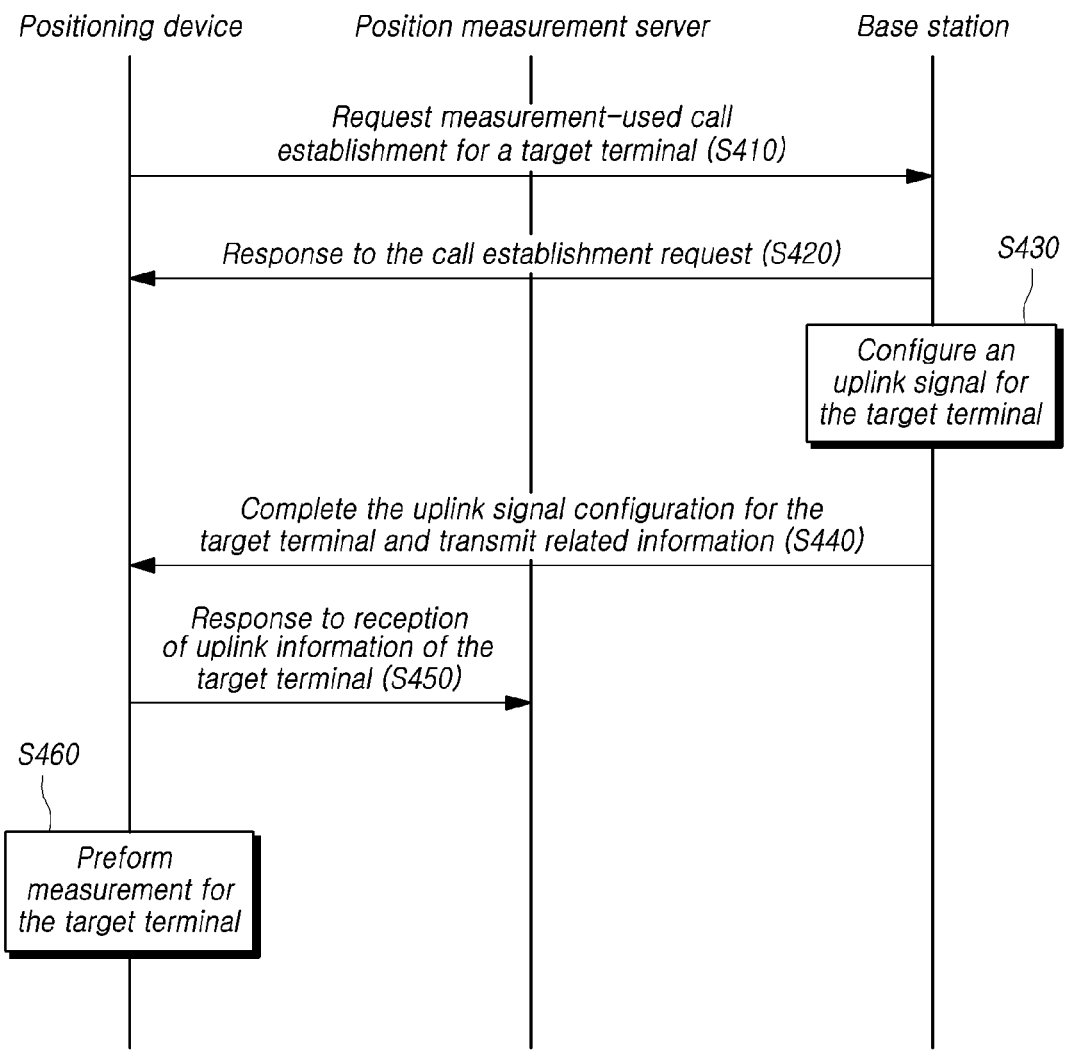
FIG. 4 illustrates signal flows between a base station of a mobile communication network, a position measurement server, one or more positioning devices according to an embodiment of the present disclosure.

FIG. 4 illustrates signal flows and states between a base station of an associated mobile communication network, a position measurement server, and one or more positioning devices according to an embodiment of the present disclosure. Referring to FIG. 4, the positioning device is in a standby state in the initial stage. When an uplink channel configuration request for a target terminal is provided to the mobile communication network, in response to this, the base station provides information on the reception of a corresponding call and uplink channel configuration request for the target terminal to the positioning device and the position measurement server. When such response is received from the mobile communication network, the positioning device transitions from the standby state into a target terminal uplink channel configuration standby state. In another embodiment, when the positioning device receives an input from a searcher carrying the positioning device, the positioning device transitions from the standby state into a target terminal uplink channel configuration standby state. The base state transition configures a measurement-used uplink channel for the target terminal, and provides information on this to the position measurement server and positioning device. Such information may include information on uplink channel configuration and resource assignment of the target terminal and identification information of the target terminal. The positioning device and the position measurement server receiving the information transition into a target terminal uplink channel measuring state, and then measure a signal for an uplink channel of the target terminal. In this state, the positioning device measures a signal of the target terminal and transmits the resulted measurement to the position measurement server, and the position measurement server calculates a position of the target terminal based on the received measurement. The positioning device displays such a state on a display so that a corresponding searcher can recognize which state the target terminal is in.

Figure 5:
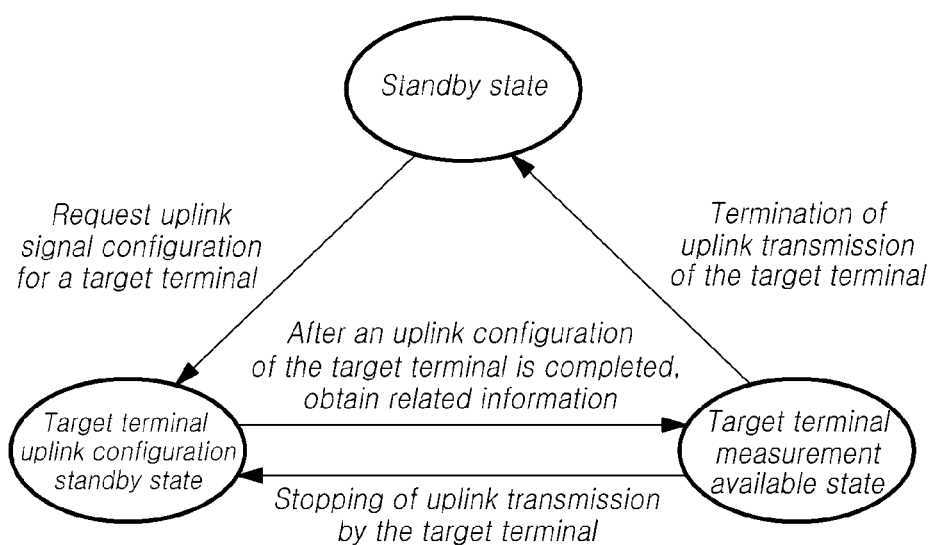
FIG. 5 illustrates state transitions of a positioning device according to an embodiment of the present disclosure.

FIG. 5 is a state diagram of the positioning device according to embodiments of the present disclosure. In FIG. 5 illustrates that the positioning device has 3 states; however, embodiments of the present disclosure are not limited thereto. For example, it should be noted that one or more of the states may be divided into two or more sub-states, or two state may be combined to define them as one state. Further, a state of the positioning device may be shared with the position measurement server so that operations between the positioning device and the position measurement server are performed based on an identical state. In particular, it is important for the positioning device and the position measurement server in a target terminal measurement available state to be in identical state.

Referring to FIG. 5, the positioning device enters a standby state when power is turned on. When the positioning device receives a measurement request for a target terminal from a searcher using the positioning device or a mobile communication network, the positioning device transitions from the standby state to a target terminal uplink configuration standby state. After an uplink configuration of the target terminal is completed, when the positioning device obtains information related to the uplink configuration of the target terminal from the mobile communication network, the positioning device transitions from the target terminal uplink configuration standby state to a target terminal uplink signal measurement available state in which a signal from the target terminal can be measured. The base station may configure the target terminal to transmit an uplink signal during a predetermined time period T1. The positioning device can measure uplink signals from the target terminal during the predetermined time period T1. In another embodiment, the base station may cause the target terminal to stop transmitting an uplink signal when the predetermined time passes. In this case, the positioning device may transition to the standby state or to the target terminal uplink configuration standby state. If the uplink transmission for the target terminal is terminated, a state of the positioning device may transition to the standby state. If the uplink signal transmission of the target terminal is resumed after a predetermined time T2 elapses, a state of the positioning device transitions to the target terminal uplink configuration standby state. When transitioning to the standby state, the positioning device may erase information on the target terminal, previous configuration information, and measurement results. In another example, when the positioning device transitions to the target terminal uplink signal configuration standby state, all or some of the information on the target terminal, the previous configuration information, and the measurement results are stored in a memory, and remained and managed. In this case, channel measurements and measurement results for the target terminal are not configured to be transmitted to the position measurement server. Further, when the position measurement of the target terminal is completed and additional measurement is not required, the mobile communication network may stop the uplink signal configuration for the target terminal, and in this case, the positioning device transitions to the standby state. In this process, a searcher may inform the position measurement server and the base station that no additional measurement is required through the positioning device. In another example, by inputting a search termination to another communication server or the position measurement server, at least one of these servers may provide this information to the positioning device and the base station.

Each state of the positioning device defined in FIG. 5 may include one or more sub-states. For example, in the target terminal uplink signal measurement available state of FIG. 5, the positioning device attempts to measure an uplink signal of the target terminal. However, in this state, there is a possibility that a signal of the target terminal may not be detected. According to positions of the positioning device and the target terminal, there may be an area in which a signal of the target terminal can be detected, and another area in which a signal of the target terminal cannot be detected. Therefore, the uplink signal measurement available state of the target terminal may be divided into a sub-state in which a signal from the target terminal is successfully detected and a sub-state in which a signal of the target terminal is not detected.

Figure 6:
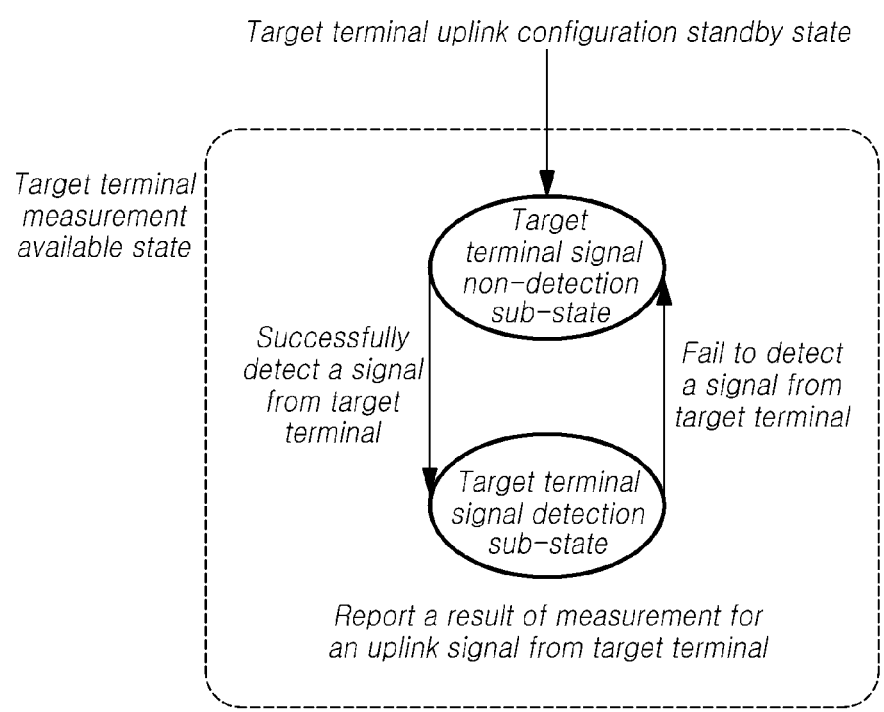
FIG. 6 illustrates two sub-states of an uplink signal measurement available state of a positioning device with respect to an uplink signal from a target terminal according to an embodiment of the present disclosure.

FIG. 6 illustrates operations related to the two sub-states when a positioning device of the present disclosure is in the target terminal uplink signal measurement available state. Referring to FIG. 6, the positioning device in the target terminal uplink signal measurement available state is in one of the target terminal signal detection sub-state and the target terminal signal non-detection sub-state. At an initial stage, when the positioning device transitions from the target terminal uplink signal configuration standby state to the target terminal uplink signal measurement available state, since the positioning device has not detected a signal from the target terminal yet, the positioning device enters the target terminal signal non-detection sub-state. However, as the positioning device moves to the target terminal, when the positioning device is close to the target terminal, and detects a signal of the target terminal, the positioning device transitions to the target terminal signal detection sub-state. In another example, when the positioning device fails to detect a signal from the target terminal due to a change in a propagation environment or a movement in the target terminal signal detection sub-state, the positioning device transitions to target terminal non-detection sub-state. Thus, according to a change in a propagation environment or a movement, the positioning device in the target terminal uplink signal measurement available state transitions between the target terminal signal detection sub-state and the target terminal signal non-detection sub-state.

Among these two sub-states, when the positioning device is only in the target terminal signal detection sub-state, the positioning device can actually measure an uplink signal from the target terminal. Thus, the positioning device may be needed to provide whether or not the positioning device is in a state in which a signal from the target terminal has been successfully detected to a searcher through a display of the positioning device. Further, the positioning device may also provide information on whether or not the positioning device is in the state in which the signal from the target terminal has been successfully detected to the position measurement server, leading such information to be shared. Further, each of one or more positioning devices may obtain position information, and state/sub-state information of detection or non-detection etc., of one or more other positioning devices tracking an identical target terminal, and display such information on a display. In this process, the position measurement server receives the position information, the information related to the detection or non-detection, measurement results, and the like from one or more positioning devices, and shares the received information with one or more positioning devices tracking the identical target terminal. Further, the position measurement server may output, to a display, the position information, the information related to the detection or non-detection, the measurement information, of one or more positioning devices, and a calculated position, or a range of positions, of the target terminal. Further, the position measurement server may transmit this information to a control center, leading the information to be displayed on a monitor of the control center.

One or more positioning devices provide respective state/sub-state information to the position measurement server. The position measurement server manages information on which state/sub-state each positioning device is in. In this process, the positioning device can meaningfully measure an uplink signal of the target terminal only when the positioning device is in the target terminal signal detection sub-state of the target terminal signal measurement available state. Thus, only when the positioning device is in the target terminal signal detection sub-state, the positioning device measures an uplink signal of the target terminal and transmits resulted measurements to the position measurement server. Further, the position measurement server calculates a position of the target terminal based on one or more measurement results obtained in the target terminal signal detection sub-state, among measurement results of multiple positioning devices. Further, the position measurement server transmits a calculated position, or a range of positions, of the target terminal to all of one or more positioning devices.

Embodiments of the present disclosure have been discussed by focusing on embodiments of measuring a position of a target terminal through a position measurement server. However, it should be noted that the conception and embodiments of the present disclosure are applied to a scenario where one or more positioning devices share measurement information for a target terminal through a communication channel, and one or more of the one or more positioning devices calculate a position of the target terminal. That is, a position of a target terminal may be measured and calculated based on the state/sub-state information shared between positioning devices through the communication channel. For example, a state where one positioning device can transmit its measurement result to one or more other positioning devices through the communication channel may be limited to only the target terminal signal detection sub-state. Further, a position of the target terminal may be calculated considering only one or more measurement results of one or more positioning devices in the target terminal signal detection sub-state. Further, each positioning device may display state/sub-state information of one or more other positioning devices, as well as its own state/sub-state information, on a display, leading a corresponding searcher to recognize such information.

The present disclosure relates to methods and apparatuses for enabling one or more positioning devices to be placed around an approximate position based on information on the approximate position of a target terminal received from a mobile communication network, and after a base station configures the target terminal to transmit an uplink signal, allowing the one or more positioning device to measure the uplink signal from the target terminal. The approximate position information of the target terminal received by the positioning device may be information on a coordinate to be indicated on a map. Further, the positioning device may receive position information of a base station of a cell in which the target terminal is placed. Further, one of information items needed to be received by the positioning device is identification (ID) information of the base station of the cell in which the target terminal is placed. Such information is called a cell ID in the LTE system. In an initial stage, a base station of an associated mobile communication network transmits cell ID information of the base station to a position measurement server, and the position measurement server transfers the received information to one or more positioning devices. In another embodiment, the mobile communication network may directly transmit the cell ID information to one or more positioning devices.

The positioning device of the present disclosure is required to receive a signal from the base station maintaining an established link with the target terminal using one or more downlink receivers. This is needed for acquiring time synchronization by receiving a downlink signal, and based on this, obtaining information on an uplink time. Thus, based on the cell ID information of the base station, the positioning device of the present disclosure is required to operate in a state where the positioning device has received a downlink signal from the base station of that cell ID. If the positioning device does not receive a signal from the base station maintaining an established link with the target terminal, the positioning device may not stably detect and measure an uplink signal of the target terminal.

Further, as another reason, since the positioning device may be placed near the target terminal when the positioning device is placed in an area that can receive a signal from the base station maintaining an established link with the target terminal, the positioning device is therefore needed to receive a signal from the base station of the cell ID.

To do this, the positioning device obtains cell ID information of the base station maintaining an established link with the target terminal, and determines whether the positioning device stably receives a downlink signal from the base station of that cell ID. This determination may be performed based on whether an RSSI or SNR of a downlink signal received from the base station is greater than or equal to a predetermined threshold value. Further, the positioning device provides the information to the position measurement server.

The positioning device may obtain the cell ID information of the base station maintaining an established link with the target terminal, and display, on a display, whether a signal from the base station of that cell ID is stably received. Further, as another embodiment, quality of a signal from the base station may be displayed in the form of an SNR, an RSSI, or the like on a display of the positioning device. Further, information on the quality, together with measurement information for the target terminal, may be provided to the position measurement server.

The positioning device indicates information on an estimation such as coordinates or an estimated range of a position of the target terminal on a map. Further, the positioning device may indicate, on the map, one or more positions of one or more other positioning devices tracking the position of the target terminal, as well as its own position. Further, each positioning device may display whether a downlink signal of the base station maintaining an established link with the target terminal is stably received.

Typically, one cell of an associated mobile communication system is split into a plurality of sectors. Thus, each sector has a unique cell ID. Base stations of a plurality of sectors within one cell are generally synchronized in time with one another. Further, time synchronization between a plurality of cells in the vicinity is generally maintained.

In this case, even when a positioning device does not directly synchronize in time with a base station maintaining an established link with a target terminal, the positioning device may detect an uplink signal from the target terminal by obtaining information on time synchronization from another base station. Considering such environment, when a mobile communication network transmits a cell ID of the base station maintaining an established link with the target terminal, the network may transmit together cell IDs of other base stations maintaining time synchronization between base stations in the vicinity. If time synchronization is maintained between all base stations, the base station may provide that information to one or more positioning devices. In another embodiment related to this process, an associated mobile communication network provides the information on this to a position measurement server, and the position measurement server may provide the information to the one or more positioning devices.

Based on the information, the positioning device receives a downlink signal of a base station maintaining an established line with the positioning device. If it is difficult for the positioning device to receive the signal from the base station stably, the positioning device may acquire synchronization to another base station maintaining synchronization with that base station. The positioning device may provide the information to the position measurement server. This process is performed based on cell ID information of base stations maintaining time synchronization discussed in the above process.

The positioning device may obtain the cell ID information of the base station maintaining an established link with the target terminal, and display, on a display, whether a signal from the base station of the cell ID is stably received. Further, as another embodiment, quality of a signal from the base station may be displayed in the form of an SNR, an RSSI, or the like on a display of the positioning device. If it is difficult for the positioning device to detect a signal from the base station, the positioning device may receive a downlink signal of another base station maintaining time synchronization with the base station, measure quality of the signal, and acquire time synchronization based on the signal. The positioning device may display such a state on a display. Further, the positioning device may display, on a display, whether time synchronization, i.e. time reference, is acquired based on a downlink signal received from the base station maintaining an established link with the target terminal or based on a downlink signal received from another base station, and provide this to the position measurement server. Further, in another embodiment, the positioning device may display a cell ID of a base station from which the time reference has been acquired on a display, and provide such information to the position measurement server. Further, the positioning device may transmit such information and information on quality of a downlink signal of the base station currently received, together with measurement information for the target terminal, to the position measurement server.

The positioning device indicates information on an estimation such as coordinates or an estimated range of a position of the target terminal on a map. Further, the positioning device may indicate, on the map, one or more positions of one or more other positioning devices tracking a position of the target terminal, as well as its own position. Each positioning device may share information on a received downlink cell ID with other positioning devices. Further, the positioning device may display, on a display, whether the positioning device itself and one or more other positioning devices stably receive a downlink signal from the base station maintaining an established link with the target terminal. Further, the positioning device may display, on a display, which base station each positioning device acquires time synchronization based a downlink signal from.

The position measurement server in the present disclosure calculates a position of the target terminal based on a result of measurement for an uplink signal of the target terminal taken by the positioning device. When calculating the position of the target terminal based on the measurement result from the positioning device, the position of the target terminal may be calculated reflecting quality of a downlink signal received by each positioning device. For example, in case quality of a downlink signal received by a positioning device is poor, a position of the target terminal may be calculated by giving a low weight to, or not taking account of, a result of measurement for the signal of the target terminal taken by the positioning device.

In the present disclosure, when the mobile communication network receives an uplink signal configuration request for measuring a position of the target terminal, after maintaining an uplink signal that has already configured or newly configuring an uplink to measure an uplink signal from the target terminal more accurately, the mobile communication network provides all or some of information on the uplink signal that has already configured to the positioning device. In this process, the request for such position measurement may be performed by one or more positioning devices, the position measurement server, an emergency rescue center, and the like.

In case the base station of the mobile communication network receives a request for measuring a position of the target terminal, the base station provides the positioning device with an uplink signal configuration of the target terminal and corresponding resource assignment information, identification information of the target terminal, and the like. That is, the base station of the mobile communication network may directly transmit such information to one or more positioning devices. In another example, the base station may transmit it to a communication server, and then the communication server may transfer it to one or more positioning devices. In this case, the position measurement server may serve as the communication server. The positioning device of the present disclosure detects and measures an uplink signal from the target terminal based on such information.

In order to detect and measure an uplink signal of the target terminal, it is necessary for the positioning device to obtain signal configuration and resource assignment information of the uplink signal. In one embodiment to do this, the positioning device may receive identification information of the target terminal, and based on this, obtain resource assignment information and signal configuration information transmitted to the target terminal by analyzing a downlink signal transmitted by the base station. An RNTI of the target terminal may be used as the identification information. In another embodiment, the base station of the mobile communication network provides the positioning device with the uplink signal configuration and the corresponding resource assignment information of the target terminal. In another embodiment, in a situation where the base station of the mobile communication network and the positioning device define a specific signal configuration and a corresponding resource in advance, the base station may configure the target terminal to transmit a corresponding pre-defined uplink signal, and provide only whether the target terminal transmits such a signal to the positioning device. It should be noted that conceptions provided in the present disclosure may be applicable to various methods or devices capable of measuring a position of the target terminal, regardless of the above methods.

Figure 7:
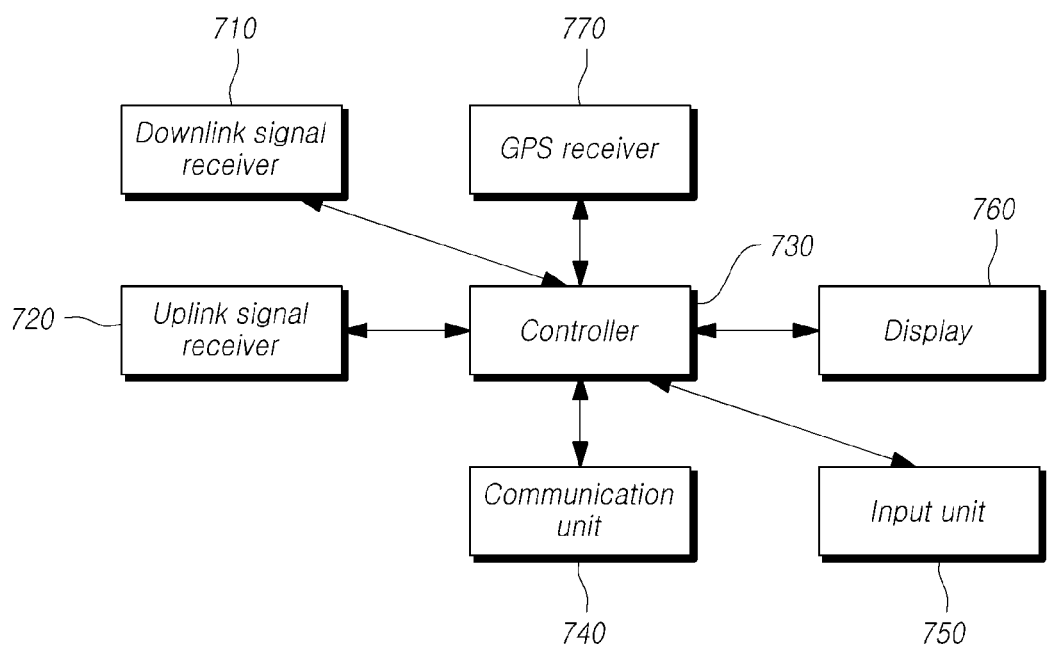
FIG. 7 illustrates a positioning device according to Embodiment 1 of the present disclosure.

FIG. 7 illustrates configurations of a positioning device according to an embodiment of the present disclosure. Referring to FIG. 7, the positioning device of the present disclosure includes one or more downlink signal receivers 710 and one or more uplink signal receivers 720 to receive a signal in a mobile communication network. Further, the positioning device includes a controller 730 for controlling a received signal. Optionally, the positioning device may include a communication unit 740 for performing communication with a base station, a position measurement server, or one or more other positioning devices, a GPS receiver 770 for performing synchronization with an absolute time, an input unit 750 for receiving an input from a user, and a display 760 displaying information processed by the controller 730.

Here, the downlink signal receiver 710 and the uplink signal receivers 720 may be an LTE downlink signal receiver and an LTE uplink signal receiver, respectively. The downlink signal receiver in the present disclosure may configure a frequency band for transmitting control information as a frequency band on which a target terminal transmits an uplink signal. Embodiments of the present disclosure are discussed based on the LTE system; however, may be easily applied to other wireless communication systems. That is, in a case where a communication system in which a call of a target terminal is established is a GSM or W-CDMA system, the downlink signal receiver 710 and the uplink signal receiver 720 are implemented as a downlink signal receiver and an uplink signal receiver of GSM or W-CDMA system, respectively.

The LTE downlink signal receiver captures an LTE downlink signal in an initialization stage and acquires time synchronization to the system, and obtains an ID of an associated base station, system information, and the like. Further, a downlink signal strength may be obtained by measuring a signal transmitted by the base station and displayed on a display. Further, the ID of the base station or whether the downlink signal receiver or the positioning device is placed within a desired service area of the base station can be displayed on the display. Through this, a user can identify whether the downlink signal receiver or the positioning device is located within a desired service area of the base station. A BCCH, and the like may be received through the downlink signal receiver, and system information may be obtained.

The LTE uplink signal receiver detects an uplink signal transmitted by a target terminal and performs measurement to obtain information on a position of the target terminal.

In order to detect and measure an uplink signal from the target terminal, the positioning device is required to obtain information on configuration and resource assignment for the uplink signal transmitted by the target terminal. The positioning device according to embodiments of the present disclosure may obtain identification information of the target terminal, and based on this, receive an uplink signal transmitted by the base station using the downlink signal receiver 710, and by analyzing the received signal, obtain information on configuration and resource assignment of an uplink signal of the target terminal. In this process, after the base station of the mobile communication network receives a request for measuring a position of the target terminal, the base station may provide identification information of the target terminal to the positioning device. In another example, the base station may provide the information to a communication server, and then the communication server may transmit it to the positioning devices. Further, in another embodiment, information on uplink configuration and resource assignment of the target terminal may be received via the communication unit 740 from a communication server, and a position measurement server may be used as the communication server. In another embodiment, a signal of the target terminal may be configured to be transmitted over a resource and at a time that are defined in advance between the mobile communication network and the positioning device, and the resource assignment information and the configuration information can be used. The controller 730 obtains such information on the uplink channel configuration and the resource assignment of the target terminal and controls a process of detecting and measuring a signal from the target terminal.

Further, the positioning device acquires an absolute time reference, and can calculate a difference in times at which respective positioning devices receive an uplink signal of a target terminal. In the embodiment of FIG. 7, to do this, one or more positioning devices can acquire time synchronization based on a GPS signal received by the GPS receiver 770. Time synchronization may be obtained by using other techniques, such as SBAS, Galileo, or the like used for measurement or time information, as well as the GPS, or may be established based on a combination between at least one of these techniques and the GPS. However, embodiments of the present disclosure are not limited thereto. For example, time synchronization may be established between other types of positioning devices, or any method capable of identifying a difference in arriving times may be used. In an example, time synchronization may be implemented by time aligned in advance between positioning devices using a high-precision clock, or by any method or technique capable of calculating a relative difference in time. Further, position measurement can be performed based on a time difference between a time at which the LTE downlink signal receiver receives a specific signal and a time at which another user, such as another LTE downlink signal receiver or another positioning device, receives an uplink signal. Information on these reception times is transmitted to the position measurement server.

In embodiments of the present disclosure, to communicate with the position measurement server or to communicate directly with one or more other positioning devices, a separate communication unit 740 may be employed. The communication unit 740 may use a band different from a band for measuring a signal of the target terminal. This is for preventing the communication unit from interfering with an uplink signal transmitted by the target terminal.

The positioning device of FIG. 7 includes an output device such as a display for providing a position of the target terminal to a user. Further, the positioning device includes the input unit 750 for receiving an input from a user. It is possible to increase the accuracy of position measurement by allowing the user to manually input additional information such as information on a current position of the positioning device through the input unit 750. Further, a searcher may input a request for measuring a position of the target terminal through the input unit 750.

The controller 730 of FIG. 7 controls operations of the positioning device. The controller 730 is connected to associated devices, units, or components, and controls information reception, measurement, communication, input and output, and the like needed to perform embodiments of the present disclosure.

Figure 8:
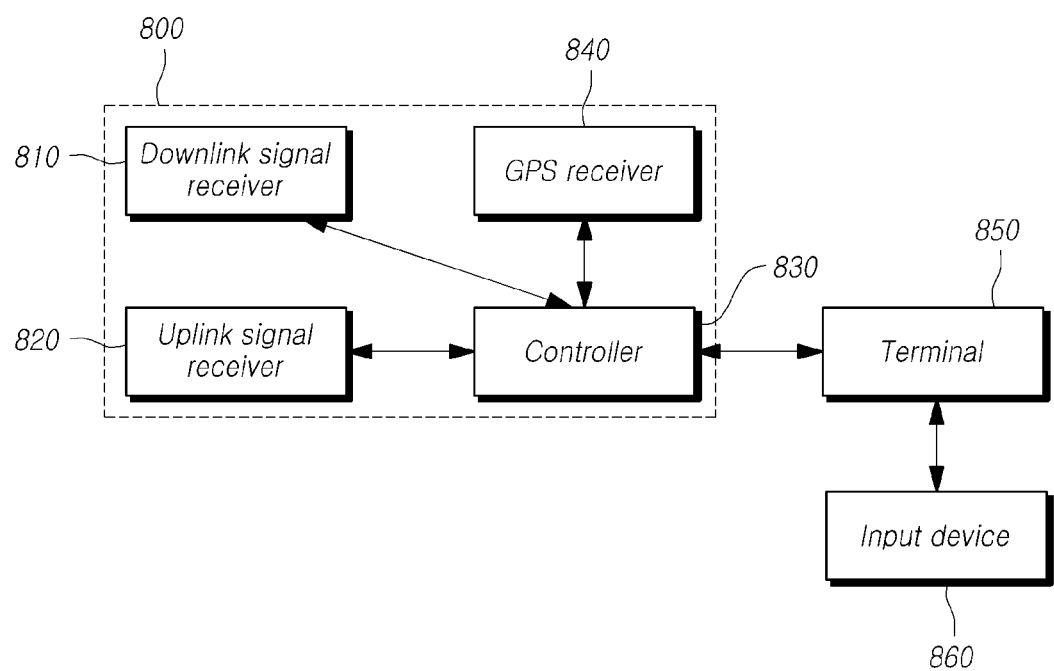
FIG. 8 illustrates a positioning device according to Embodiment 2 of the present disclosure.

FIG. 8 illustrates configurations of a positioning device according to another embodiment of the present disclosure. A difference of the embodiment of FIG. 8 from the embodiment of FIG. 7 is that functions such as communication with other external equipment (a positioning device or a position measurement server), displays of data or information, inputs of data or commands, and the like are performed by an externally-connected terminal 850 such as a smartphone, a tablet, or the like, resulting in the number of components included in the positioning device being reduced. The positioning device 800 in FIG. 8 includes a downlink signal receiver 810, an uplink signal receiver 820, a controller 830, and a GPS receiver 840. Some functions of the positioning device 800, such as a function for communication with other equipment, a display function, an input function, and the like are implemented by using a wired or wireless connected terminal 850 such as a smartphone, a tablet, or the like. A portion indicated by a dotted line in FIG. 8 is a new type of positioning device distinguished from the positioning devices described above. A connection between the controller 830 and the terminal 850 in FIG. 8 may be performed through a wired connection as in a USB, or be wirelessly performed through WiFi, or the like. In another embodiment, in a situation where both a wired connection and a wireless configuration are available to connect between such a positioning device and another terminal or device, such as a USB, a smartphone, a tablet, and the like, optionally, one desired connection may be selected according to a situation. Further, input and/or output units or devices, and/or interfaces for input and/or output, for a power-on/off, a function setting, and the like may be included in the positioning device as indicated by the dotted line in FIG. 8.

Figure 9:
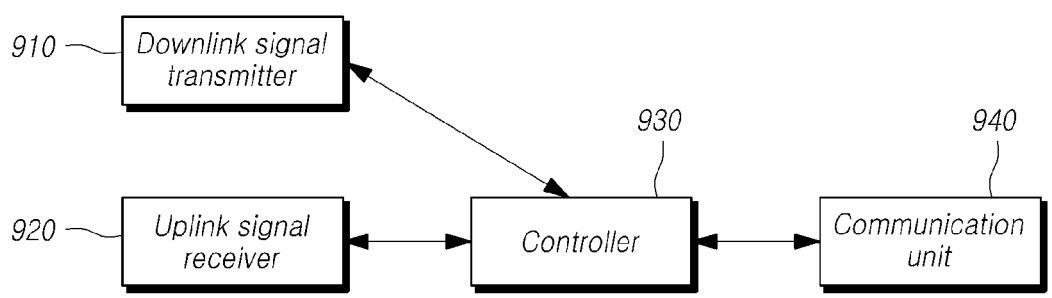
FIG. 9 illustrates a mobile communication network according to an embodiment of the present disclosure.

FIG. 9 illustrates a structure of a base station of a mobile communication network according to embodiments of the present disclosure. Referring to FIG. 9, the base station includes a downlink signal transmitter 910 and an uplink signal receiver 920. The downlink signal transmitter 910 performs a function of transmitting a signal to terminals. Further, the uplink signal receiver 920 performs a function of receiving an uplink signal transmitted by the terminals. Further, the base station of the mobile communication network includes a communication unit 940 for transmitting RNTI information or information on channel configuration and resource assignment of a target terminal to one or more positioning devices. The base station provides a state of the target terminal to the positioning device. Further, a cell ID of a base station maintaining an established link with the target terminal and a cell ID of an adjacent base station maintaining time synchronization with the base station may be transmitted to the positioning device. The communication unit 940 may directly transmit such information to the positioning device. In another method, the information of the target terminal may be transmitted to another communication server, and then the communication server may transfer the information to the positioning device. At this time, the position measurement server may serve as the communication server. Further, instead of separately employing the communication unit 940 for transmitting the identification information and the information on channel configuration and resource assignment of the target terminal, and the cell ID information of the base station, the base station may be configured to communicate using a downlink signal transmitter 910 and an uplink signal receiver 920. Further, the controller 930 may configure a target terminal to transmit a signal using the downlink signal transmitter 910 and the uplink signal receiver 920 of the base station. Further, the controller 1330 performs a function of checking whether a signal configured through the uplink signal receiver 920 is properly received.

Figure 10:
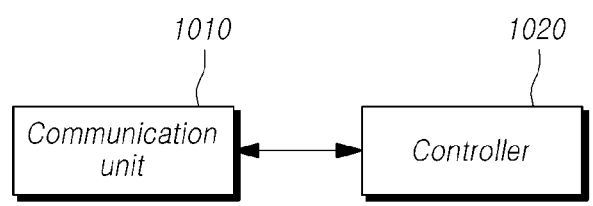
FIG. 10 illustrates a position measurement server according to an embodiment of the present disclosure.

FIG. 10 illustrates a position measurement server according to embodiment of the present disclosure. The position measurement server includes a communication unit 1010. The communication unit 1010 has a function of communicating with an associated mobile communication network and one or more positioning devices. The function of communicating with the mobile communication network receives identification information or information on uplink channel configuration and resource assignment of a target terminal. Further, state information of a target terminal, cell ID information of a base station maintaining an established link with the target terminal, and cell ID information of an adjacent base station maintaining time synchronization with the base station may be received through the communication unit. Further, when a request for measuring a position of a specific target terminal is transmitted to the position measurement server, a link establishing request for the target terminal is transferred to the mobile communication network by the communication unit. The position measurement request may be performed by one or more positioning devices or an emergency rescue center, or performed through an input unit connected to the position measurement server. When the positioning device requests position measurement, it is transferred via the communication unit 1010. At this time, a phone number of the target terminal, an IMSI, or the like may be used as identification information of the target terminal. Further, a serial number of a terminal, a TMSI, or the like may be used. The function of communicating with the positioning device performs communication with the positioning device. The positioning device transmits a measurement of a signal transmitted by the target terminal, and based on this, the position measurement server calculates a position of the target terminal and transmits this to the positioning device. The measurement of the signal includes a strength of a signal from the target terminal, a time delay, a reception direction, and the like. Further, the measurement may include a position of the positioning device, a time at which a signal has been measured, and the like.

The positioning device includes a controller 1020. The controller 1020 controls a function of requesting a link establishment for the target terminal to an associated mobile communication network, and receiving identification information or information on channel configuration and resource assignment of the target terminal, and the like from a base station of the mobile communication network. Further, state information of the target terminal, cell ID information of a base station maintaining an established link with the target terminal, and cell ID information of an adjacent base station maintaining time synchronization with the base station may be received. The position measurement server transfers information received from the mobile communication network to one or more positioning devices. Further, the position measurement server performs a function of receiving measurements obtained by measuring the uplink of the target terminal from one or more positioning devices, and calculating a position of the target terminal and transmitting it to one or more positioning devices. Further, the controller controls a function of receiving a position measurement request for the target terminal from one or more positioning devices, or one or more other devices, and transferring it to the mobile communication network.

Examples of the positioning device employed in the present disclosure may be implemented by using one or more embodiments or examples described in Korea Patent Application No. 10-2018-0046139, entitled "APPARATUS AND METHOD FOR POSITIONING OF MOBILE COMMUNICATION UE"; Korea Patent Application No. 10-2018-0048825, entitled "APPARATUS AND METHOD FOR CONFIGURING UPLINK SIGNAL FOR POSITIONING OF MOBILE COMMUNICATION UE"; Korea Patent Application No. 10-2018-0101066, entitled "METHOD AND APPARATUS FOR POSITIONING USER EQUIPMENT IN MOBILE COMMUNICATION SYSTEM"; and Korea Patent Application No. 10-2019-0045762, entitled "(POSITION MEASUREMENT SYSTEM FOR MOBILE TERMINAL", or by modifying such embodiments or examples.

In accordance with embodiments of the present disclosure, when it is desired to measure a position of a target terminal in a standby state, position measurement for the target terminal can be performed by enabling the target terminal to transmit an uplink signal for position measurement while avoiding or minimizing a change in operation of the target terminal. Further, a method is provided for efficiently measuring a position of a target terminal. To do this, the positioning device can measure a distance, a position, and the like based on an uplink signal transmitted by the target terminal.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

CROSS-REFERENCE TO RELATED APPLICATION

If applicable, this application claims priority under 35 U.S.C § 119(a) of Patent Application No. 10-2018-0048825, filed on Apr. 27, 2018 and Patent Application No. 10-2019-0048789, filed on Apr. 25, 2019 in Korea, the entire contents of which are incorporated herein by reference. In addition, this non-provisional application claims priorities in countries other than the U.S. for the same reason based on the Korean Patent Applications, the entire contents of which are hereby incorporated by reference.

What is claimed is:

1. A base station comprising:
 a communication unit configured to receive an uplink signal configuration request for a terminal in a standby state from a positioning device or a server communicating with the positioning device;
 a controller configured to generate a state transition signal for instructing a state transition of the terminal in the standby state, and generate a downlink signal for causing the terminal to transmit an uplink signal; and
 a transmitter configured to transmit the state transition signal and the downlink signal to the terminal.

2. The base station according to claim 1, wherein the communication unit transmits channel configuration information of the uplink signal or identification information of the terminal to a position measurement server or the positioning device.

3. The base station according to claim 1, wherein after the controller receives a measurement request for the terminal in the standby state, the controller generates the state transition signal for instructing the state transition of the terminal in the standby state, and generates the downlink signal for causing the terminal to transmit the uplink signal, and the transmitter transmits the state transition signal and the downlink signal to the terminal.

4. The base station according to claim 1, wherein the downlink signal is a signal with a predefined CRC error, a signal containing a predefined noise or interference signal, a signal coded with a level higher than an MCS level configured in the terminal, or a signal for requesting the terminal to transmit state information or channel environment information.

5. The base station according to claim 1, wherein the receiver receives a link state information request signal requesting link configuration state information between the base station and the terminal from a position measurement server or the positioning device, and
 wherein in response to the link state information request signal, the controller causes the link configuration state information between the base station and the terminal to be transmitted to the position measurement server or the positioning device.

6. The base station according to claim 1, wherein the state transition signal configures the terminal in standby mode to transmit the uplink signal without change at a user interface of the terminal.

7. A positioning device comprising:
 a downlink signal receiver configured to receive a downlink signal from a base station;
 an uplink signal receiver configured to receive an uplink signal from a terminal;
 a communication unit configured to transmit a measurement signal obtained by measuring the uplink signal to a position measurement server; and
 a controller configured to:
  determine whether the uplink signal receiver performs an operation of detecting the uplink signal from the terminal and whether the communication unit performs an operation of transmitting the measurement signal to the base station or the position measurement server, determine a state of the positioning device according to whether the terminal transmits the uplink signal used for positioning or whether the positioning device successfully detects the uplink signal transmitted from the terminal, and display state information of the positioning device at a display connected to the positioning device or transmit the state information of the positioning device to a server communicating with the positioning device.

8. The positioning device according to claim 7, wherein the controller determines a state of the positioning device according to whether the uplink signal receiver performs the operation of detecting the uplink signal from the terminal and whether the communication unit performs the operation of transmitting the measurement signal to the base station or the position measurement server, and wherein the communication unit transmits the state of the positioning device to the base station or the position measurement server.

9. The positioning device according to claim 7, wherein the server is a position measurement server.

10. A position measurement server comprising:

a communication unit configured to receive a measurement signal for a terminal and state information of at least one positioning device from the positioning device; and a controller configured to calculate a position of the terminal based on the measurement signal for the terminal and the state information.

11. The position measurement server according to claim 10, wherein the controller calculates a position of the terminal using an algorithm according to the state information of the positioning device and the measurement signal for the terminal.

12. The position measurement server according to claim 10, wherein the controller display the state information of the positioning device at a display connected to the position measurement server.

13. A method for configuring an uplink signal of a terminal by a base station, comprising:

receive an uplink signal configuration request for a terminal in a standby state from a positioning device or a server communicating with the positioning device;

generating a state transition signal for instructing a state transition of the terminal in the inactive state and generating a downlink signal for causing the terminal to transmit an uplink signal; and transmitting the state transition signal and the downlink signal to the terminal.

* * * * *